UNITED STATES PATENT OFFICE.

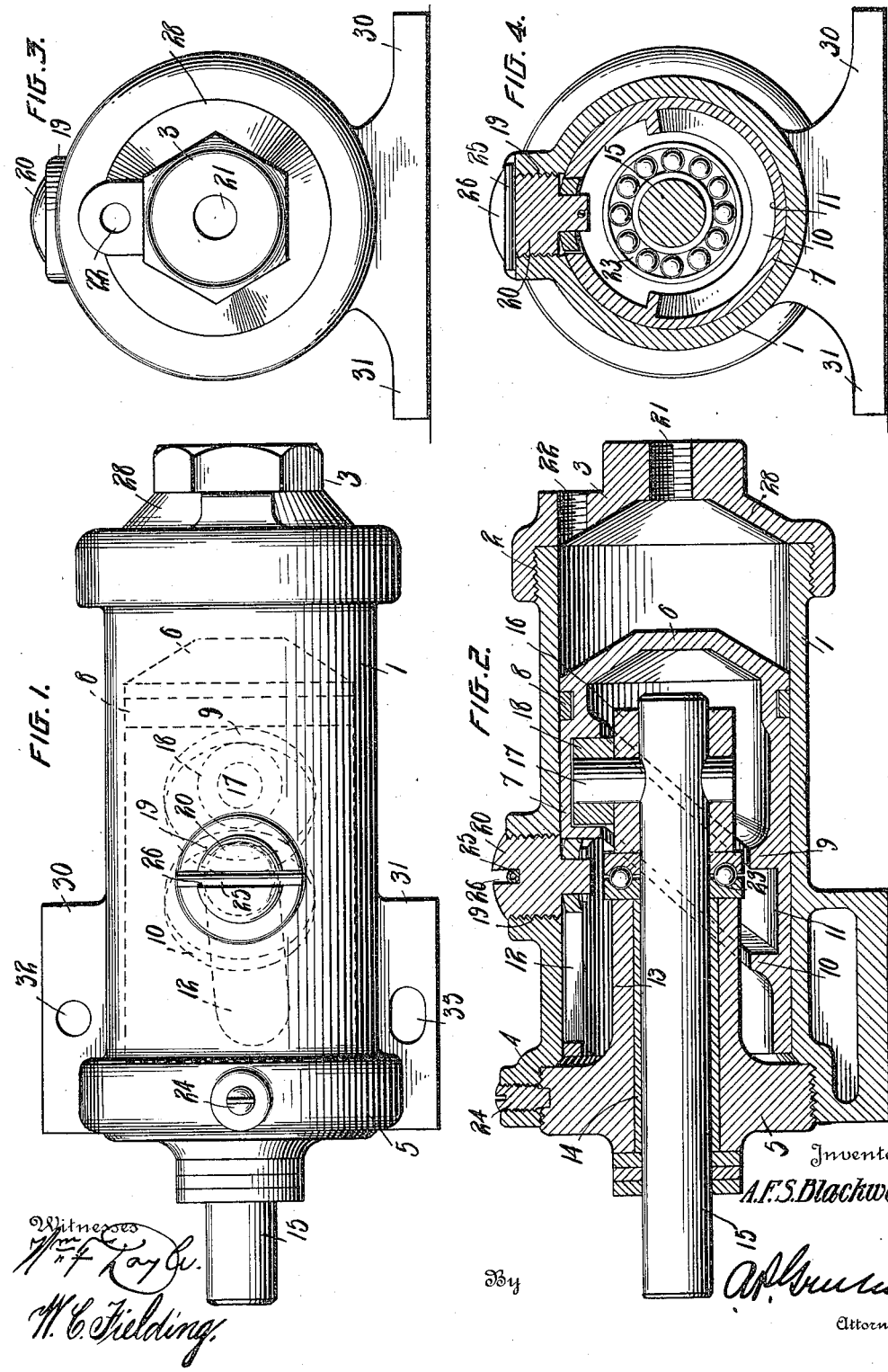

ALEXANDER FORBES STIRLING BLACKWOOD, OF DETROIT, MICHIGAN, ASSIGNOR TO DETROIT AIR PUMP COMPANY, A CORPORATION OF MICHIGAN.

PUMP.

1,150,832.  Specification of Letters Patent.  Patented Aug. 17, 1915.

Application filed April 6, 1914. Serial No. 829,833.

*To all whom it may concern:*

Be it known that I, ALEXANDER F. S. BLACKWOOD, a citizen of the United States, residing at Detroit, in the county of Wayne, State of Michigan, have invented certain new and useful Improvements in Pumps, of which the following is a description, reference being had to the accompanying drawings, forming a part hereof.

My invention relates to pumps particularly intended for compressing air, and has for its object to provide a simple, inexpensive and efficient pump adapted to be operated by rotary motion.

With these and other objects in view my invention consists in the construction and combination of elements hereinafter described and particularly pointed out in the claims.

Referring to the drawings, Figure 1 is a top plan view of a pump embodying my invention. Fig. 2 is a longitudinal central sectional view of the pump. Fig. 3 is an end view of the pump, and Fig. 4 is a cross sectional view of the pump taken on a plane passing through the center of the plug 20.

In the drawings 1 indicates the cylinder of the pump, screw threaded exteriorly at the delivery end, as shown at 2, to receive a head 3, and interiorly threaded at the opposite end, as shown at 4, to receive a head 5. Within the cylinder is arranged a piston comprising a head 6 and cylindrical portion 7 fitting within the cylinder 1 and provided with one or more packing rings 8. The cylindrical portion 7 of the piston is open at its rear end, and is provided on its interior with ribs 9 and 10 arranged to form between them a cam groove 11. The cylindrical portion 7 is also provided with a slot 12 extending in a direction longitudinal of the piston but at a slight angle to its axis.

The rear head 5 is provided with a forwardly extending portion 13 of reduced diameter adapted to extend into the cylindrical portion 7 of the piston, and through the head 5 and its forward extension 13 is formed a bore 14, through which extends the driving shaft 15. On the inner end of the driving shaft is secured a sleeve 16 provided with a radial pin 17, having on its outer end outside the sleeve 16 a ring 18 arranged to turn freely on the pin and adapted to fit in the cam groove 11. As the shaft 15 is rotated it will be obvious that the ring 18 traveling in the cam groove will cause the piston to be reciprocated positively in both directions.

In the wall of the cylinder 1 is formed an opening 19, through which extends a plug 20 having its inner end reduced in diameter, and provided with a ring 21 adapted to fit the slot 12 so as to prevent the piston from rotating with the shaft 15 and at the same time to guide it in its reciprocation. By reason of the fact that the slot 12 is arranged at a slight angle to the axis of the piston the piston as it reciprocates will rotate back and forth through a limited arc, thus preventing the formation of grooves or scores on the interior surface of the cylinder in direct line with its axis and tending to lessen the formation of grooves or scores by subjecting the particles of hard material which would cause grooving or scoring to a rolling action, and thus tending to crush them. Also whatever grooves or scores are formed will be on somewhat spiral lines, which will facilitate the distribution of the lubricant used.

The head 3 at the delivery end of the cylinder is provided with a central opening 21 for attachment of a tube or pipe through which the air or other fluid is to be forced by the pump, and having at one side of the center an opening 22 for connecting the intake, not shown. The intake will, of course, be provided with the usual inwardly-opening valve, and the delivery tube or pipe will be provided with the usual outwardly-opening valve.

At the inner end of the extension 13 of the rear head a bearing 23 for the rear end of the sleeve 16 is arranged, preferably a ball bearing as shown.

The rear head 5 is preferably locked against removal by a pin 24. The plug 20 is preferably locked against movement by means of a pin 25 arranged in a slot 26 extending across the head of the plug and engaging a slot or slots in the outer end of the walls of the opening 19.

The inner face of the head 3 is coned out as shown at 28, so that the air or other fluid will be directed toward the delivery opening 21, and the forward end of the head 6 is cone shaped to correspond with the shape of the inner face of the head 3.

The end of shaft 15 extends rearward a sufficient distance to permit of securing thereto a driving pulley or gear, not shown.

The cylinder 1 is preferably formed in a casting, having at its base side extensions 30 and 31. The side extension 30 is provided with a bolt hole 32 and the side extension 31 is provided with a curved slot 33 adapted to receive a securing bolt, so that by loosening the securing bolt which passes through the slot 33 the pump may be swung on the bolt which extends through bolt hole 32 so as to bring the gear carried by the shaft 15 into and out of position to be engaged by a driving gear.

The pump, as above described, is adapted to be built in small sizes, and is particularly adapted for use as an air pump for automobiles, to furnish air for pumping up tires or for other purposes.

Having thus described our invention, what I claim is:

1. In a pump in combination with the pump cylinder, a piston adapted to reciprocate therein having a head and a cylindrical portion and having its cylindrical portion provided on its interior with a cam groove, and a rotary shaft extending into one end of the cylinder and provided with means for engaging the said cam groove.

2. In a pump in combination with the pump cylinder a piston adapted to reciprocate therein having a head and a cylindrical portion and having its cylindrical portion provided on its interior with a cam groove, and a rotary shaft extending into one end of the cylinder and provided with means for engaging the said cam groove, the delivery end of the cylinder having a central opening and having its inner face concaved.

3. In a pump in combination with the pump cylinder a piston adapted to reciprocate therein having a head and a cylindrical portion and having its cylindrical portion provided on its interior with a cam groove, and a rotary shaft extending into one end of the cylinder and provided with means for engaging the said cam groove, the delivery end of the cylinder having a central opening and having its inner face concaved and the piston head being convex to fit the inner face of the cylinder head.

4. In a pump in combination with the pump cylinder a piston adapted to reciprocate therein and having a head and a cylindrical portion, said cylindrical portion being provided on its interior with a cam groove and having formed therein a longitudinally extending guideway, a rotary shaft extending into one end of the cylinder provided with means for engaging said cam groove, and a plug carried by the pump cylinder extending thereinto to engage the guideway of the cylindrical portion of the piston.

5. In a pump in combination with the pump cylinder a piston adapted to reciprocate therein and having a head and a cylindrical portion, said cylindrical portion being provided on its interior with a cam groove and having formed therein a longitudinally extending slot arranged at an angle to the axis of the piston, a rotary shaft extending into one end of the cylinder provided with means for engaging said cam groove, and a plug carried by the pump cylinder extending thereinto to engage the slot of the cylindrical portion of the piston.

6. In a pump in combination with the pump cylinder having one head provided on its inner face with an extension of less diameter than the interior diameter of the pump cylinder, the head and extension being centrally bored, a piston adapted to reciprocate within the pump cylinder comprising a head and a cylindrical portion adapted to extend over the extension of the cylinder head and having a cam groove formed on its interior, and a rotary shaft extending through the head and extension thereof and provided on its inner end with means for engaging said cam groove.

7. In a pump in combination with the pump cylinder having one head provided on its inner face with an extension of less diameter than the interior diameter of the pump cylinder, the head and extension being centrally bored, a piston adapted to reciprocate within the pump cylinder comprising a head and a cylindrical portion adapted to extend over the extension of the cylinder head and having a cam groove formed on its interior, and a rotary shaft extending through the head and extension thereof and provided on its inner end with a sleeve carrying a means adapted to engage said cam groove, and a ball bearing between the end of the extension and the sleeve.

This specification signed and witnessed this fourth doy of April A. D. 1914.

ALEXANDER FORBES STIRLING BLACKWOOD.

In the presence of—
 RUPERT A. BELL,
 ALVAH G. PITTS.